United States Patent [19]

Curry et al.

[11] Patent Number: 5,448,521

[45] Date of Patent: Sep. 5, 1995

[54] CONNECTING A SHORT WORD LENGTH NON-VOLATILE MEMORY TO A LONG WORD LENGTH ADDRESS/DATA MULTIPLEXED BUS

[75] Inventors: Sean E. Curry, Pflugerville; Mark E. Dean, Austin, both of Tex.; Marc R. Faucher, South Burlington, Vt.; James C. Peterson; Howard C. Tanner, both of Austin, Tex.

[73] Assignee: International Business Machines Corporation, Armonk, N.Y.

[21] Appl. No.: 157,487

[22] Filed: Nov. 12, 1993

[51] Int. Cl.⁶ .................................................. G11C 8/00
[52] U.S. Cl. ........................... 365/189.02; 365/230.02; 365/63; 395/307; 395/410
[58] Field of Search ....................... 365/189.01, 189.02, 365/189.04, 230.01; 395/400, 325

[56] References Cited

U.S. PATENT DOCUMENTS

| | | |
|---|---|---|
| 4,663,732 | 5/1987 | Robinson . |
| 4,716,527 | 12/1987 | Graciotti . |
| 4,852,048 | 7/1989 | Morton . |
| 4,974,143 | 11/1990 | Yamada . |
| 5,086,407 | 2/1992 | McGarity et al. ............... 395/800 |
| 5,109,332 | 4/1992 | Culley . |
| 5,113,369 | 5/1992 | Kinoshita . |
| 5,217,095 | 6/1992 | Kadono ............................ 395/425 |
| 5,222,046 | 6/1993 | Kreifels et al. . |
| 5,293,562 | 3/1994 | Pope ............................ 365/189.02 |
| 5,303,353 | 4/1994 | Matsuura et al. . |
| 5,341,488 | 8/1994 | Kobayashi . |

FOREIGN PATENT DOCUMENTS

| | | |
|---|---|---|
| 466970A1 | 1/1992 | European Pat. Off. . |
| 480417A3 | 4/1992 | European Pat. Off. . |
| 536793A3 | 4/1993 | European Pat. Off. . |
| 605170A1 | 7/1994 | European Pat. Off. . |
| 62-154049 | 12/1985 | Japan . |
| WO81/02479 | 9/1981 | WIPO . |

OTHER PUBLICATIONS

"Bus Size Independent Architecture", IBM TDB, vol. 28, No. 8, Jan./86, pp. 3579-3581.

Primary Examiner—Viet Q. Nguyen
Attorney, Agent, or Firm—Casimer K. Salys

[57] ABSTRACT

A system and method for connecting a short word length memory to a significantly wider bus operated in an address/data multiplexing mode. A mode of operation is defined for the bus whereby the bus lines are divided for purposes of memory accessing into a data group and an address group. The data group is operable bidirectionally to read or write memory, using the addresses provided on the group of address lines. This architecture and practice is particularly suited for a boot ROM used with processors, in that such ROMs are normally of relatively short word length while the processors are of relatively long word length and are accordingly connected to buses of similar long word length. Bridge logic interfaces the processor bus to the ROM for sequencing, timing and supplemental control in converting the data from the ROM format to the processor format.

14 Claims, 7 Drawing Sheets

CONNECTING A SHORT WORD LENGTH NON-VOLATILE MEMORY TO A LONG WORD LENGTH ADDRESS/DATA MULTIPLEXED BUS

BACKGROUND OF THE INVENTION

The present invention relates generally to computer architectures. More particulary, the invention is directed to systems and methods for interfacing a short word length memory to a significantly wider bus operated in an address/data multiplexing mode.

The power-on-reset cycle used to initialize or boot a computer is prescribed by code usually stored in a non-volatile memory of the computer, typically a programmable read only memory (PROM), a flash ROM or a conventional ROM. For simplicity, the generic term ROM will be used hereinafter to represent all three classes of devices. One of skill in the art will obviously recognize that when the discussion deals with a writing operation the memory under consideration is flash ROM, or even possibly a RAM. A ROM of 0.5M bytes is typically adequate to perform the sequence. The typical commercially available ROM devices suited to this application have data ports of 8 or 16 bits.

The storage in such ROM of information other than initialization or boot code is fully contemplated, though such usage is less likely to occur. The invention will therefore be described in the context of the most likely use.

In contrast to the short word length and slow speed of the ROM devices, computer processors, such as the PowerPC 601 (Trademark of IBM Corporation) processor commercially available from IBM Corporation, use 32-bit address buses and 32/64-bit data. buses and operate at rates typically an order of magnitude faster. The features of this particular processor are described the publication PowerPC 601. Risc Microprocessor Users Manual MPC 601 UM/AD. The relative inadequacy of such ROM devices is also apparent when compared to contemporary system buses designs. An example is the Peripheral Component Interconnect (PCI) bus, as defined in the PCI Local Bus Specification distributed by the PCI Special Interest Group.

A somewhat more subtle but equally real technical problem encountered with the use of a ROM to initialize the aforementioned PowerPC 601 processor arises from the fact that the processor starts in a burst mode. In this mode the processor expects 32-bytes of data in four increments of 8 bytes each. Thus, there is a need to convert 8 or 16-bit ROM data to four increments of 8 byte units. This size corresponds to an L1 cache segment length and can be efficiently transferred using industry standard bus architectures such as the aforementioned PCI bus. Note that a segment in the PowerPC 601 is half a cache line.

Though such boot ROMS could be located on buses architected with fewer than 32-bits, such as the industry standard architecture (ISA) or tlhe extended industry standard architecture (EISA) buses, the bridge and address translations required to get from the ISA bus to the 32-bit PCI bus, and eventually to the 32/64-bit processor bus itself, would entail a significant expenditure of time and resources during any initialization and boot sequence. This is further aggravated by the time needed to translate the address in accessing the ISA or EISA buses.

Therefore, what is needed is a system and method by which a short word length ROM of relatively slow speed can be interfaced to a significantly wider bus to transfer over that bus data directed to a high speed and wide bus processor. These objectives should be attainable using commercially available processors, commercially available ROMs and in tie context of commercially defined system bus architectures.

SUMMARY OF THE INVENTION

The present invention solves the general system and processor particular problems described hereinbefore through systems and methods which connect a short data word length memory to a wider address/data bus communicating with a processor, and in one form comprises means for connecting the data lines of the memory to a first group of bus: lines, means for connecting the address lines of tlhe memory to a second group of bus lines, means for executing a first, a memory read, mode of bus operation by writing a memory address on the second group of bus lines and readiiig memory data off the first group of bus lines, and means for executing a second mode of bus operation by writing an address on a combination of the first and second groups of bus lines and thereafter reading/writing data respectively off/on the combination of the first and second groups of bus lines. In another form, tile invention relates to methods for performing steps characterizing the system.

A preferred form and practice of the invention relates to the system initialization and burst transmission following the power-on-reset of the aforementioned PowerPC 601 processor using 8-bit flash ROM connected directly to a 32-bit address/data multiplexed bus as defined by the PCI bus standard. The data lines of the ROM are common to 8 of the 32 PCI bus lines, while the remaining 24 of the PCI bus lines are connected directly as ROM address lines. Thereby, during a single timed cycle the ROM address is sent and the ROM data is returned over the single 32 line bus. If in the alternative the ROM is being written, the ROM address and data are both sent to the ROM in the same increment of time. In the third, or normal PCI mode of operation as defined in the PCI specification, the 32 lines of the PCI bus are multiplexed between address and data usage.

As to processor particular features, the implementation allows the accumulation of byte size ROM data in an 8-byte buffer to match the size of the processor bus.

These and other features of the invention will be more clearly understood and appreciated upon considering the detailed embodiment which follows hereinafter.

DESCRIPTION OF THE PREFERRED EMBODIMENT

Figure 1:
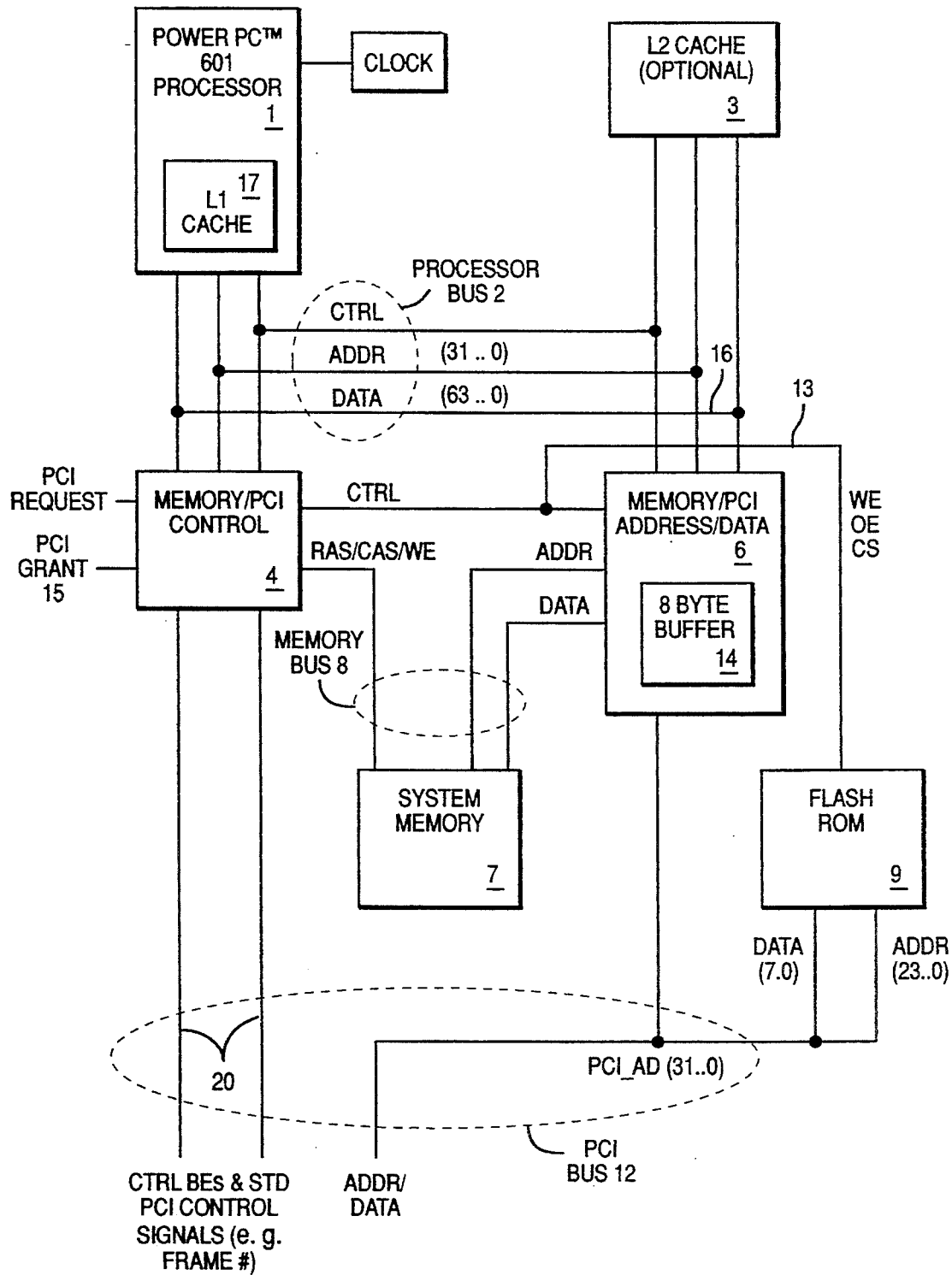
FIG. 1 is a schematic block dilagram of an embodying computer system.

FIG. 1 schematically depicts by block diagram the elements of a computer system which relate particularly to the present invention as preferably practiced. The PowerPC 601 RISC type processor 1 shares processor bus 2 with optional L2 cache 3, memory/PCI control 4 and memory/PCI address/data unit 6. Volatile type system memory 7 is connected to memory bus 8 and communicates through blocks 4 and 6 to processor bus 2. As may be apparent, the functions in blocks 4 and 6 are related by port connections. Therefore, the two are candidates for integration into a single device when semiconductor technology permits.

Flash ROM 9 is connected to PCI bus 12 for purposes of communicating addresses and data. Only the write enable, read enable, and chip select signals are transmitted over control lines 13. Note that ROM 9 has 8 data lines and 24 address lines, that PCI bus 12 has 32 lines which are under normal operations multiplexed between address and data transmission, and that processor bus 2 has 32 address lines and 64 data lines.

The architecture depicted in FIG. 1 permits short data word length ROM 9 to be connected to wide address/data bus 12, and when operated as defined to provide a timely transfer of data such as initialization and boot program code to 8-byte buffer 14. The data accumulated in buffer 14 is later transferred over 64-bit data bus 16 to processor 1. The data sent to processor 1 is organized in the 8 byte by 4 burst fetch format associated with the power-on-reset starting sequence of the PowerPC 601 processor. Memory/PCI control 4 logic includes resources for timing sequences consistent with a single beat (non-burst) transfer mode characterizing processor operation with L1 cache 17 disabled.

Figure 2:
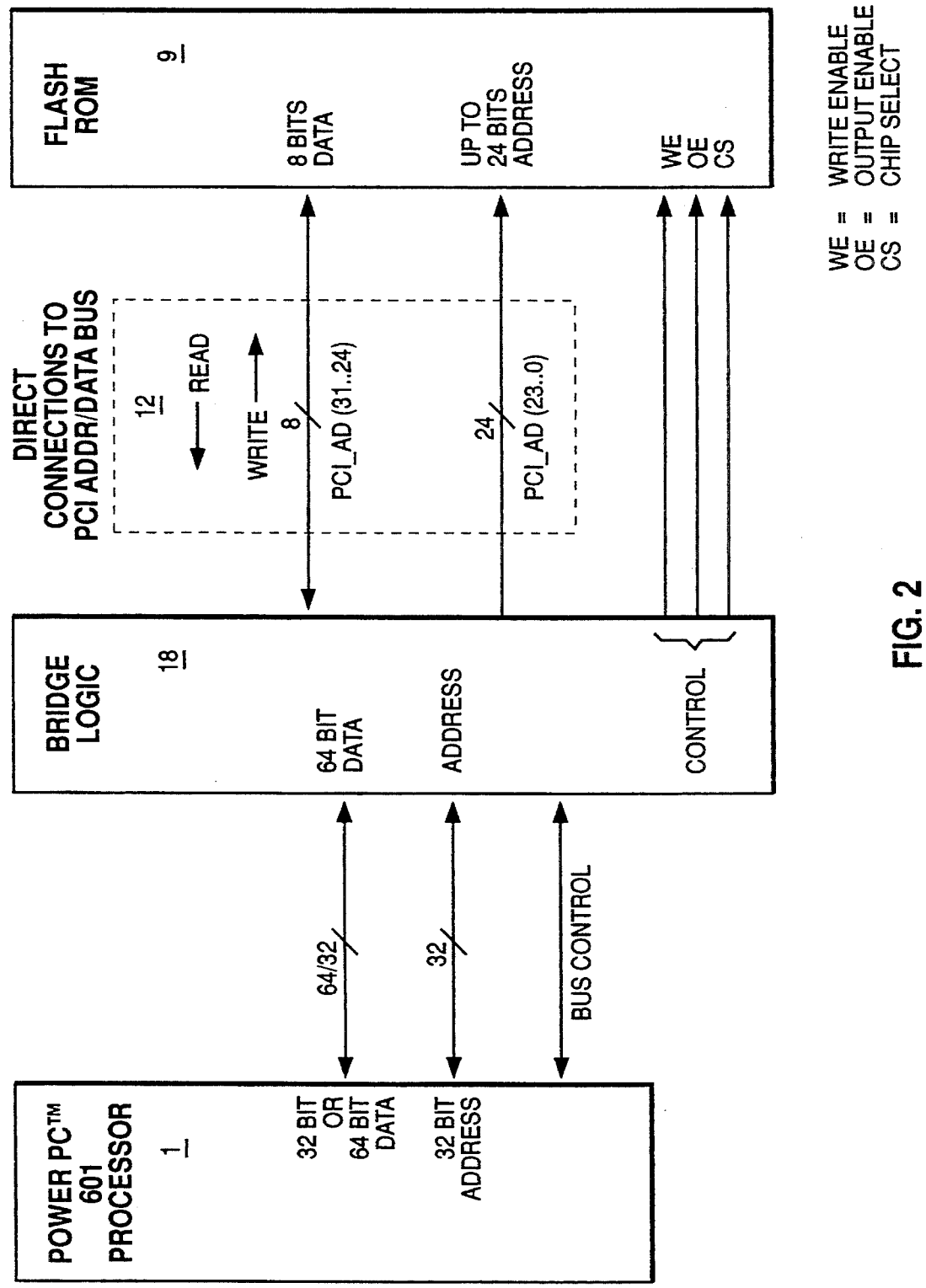
FIG. 2 is a schematic block diagram depicting the interface between the ROM and the processor.

The key eremerits which define the relationship between processor 1 and ROM 9 are schematically represented by bridge logic 18 in FIG. 2. As shown in FIG. 2, the 8-bit data port of the ROM is connected to the upper 8 lines of PCI bus 12 for both read and write operations, thereby operating bi-directionally. On the other hand, the remaining 24 lines of the PCI bus are always used to convey address data to ROM 9. Since 24-bits of address data will support up to 16M bytes of ROM, this division of data and address lines is ideally matched to the initialization and booting code needs of the system. The write enable, output enable, and chip select signals generated by bridge logic 18 are responsive directly to processor control signals indicating a single beat read cycle, a burst read cycle, or an update of the data in flash ROM 9. As embodied, bridge logic 18 interfaces to a boot sequence which starts at high address 4G−1M+100.

Figure 3:
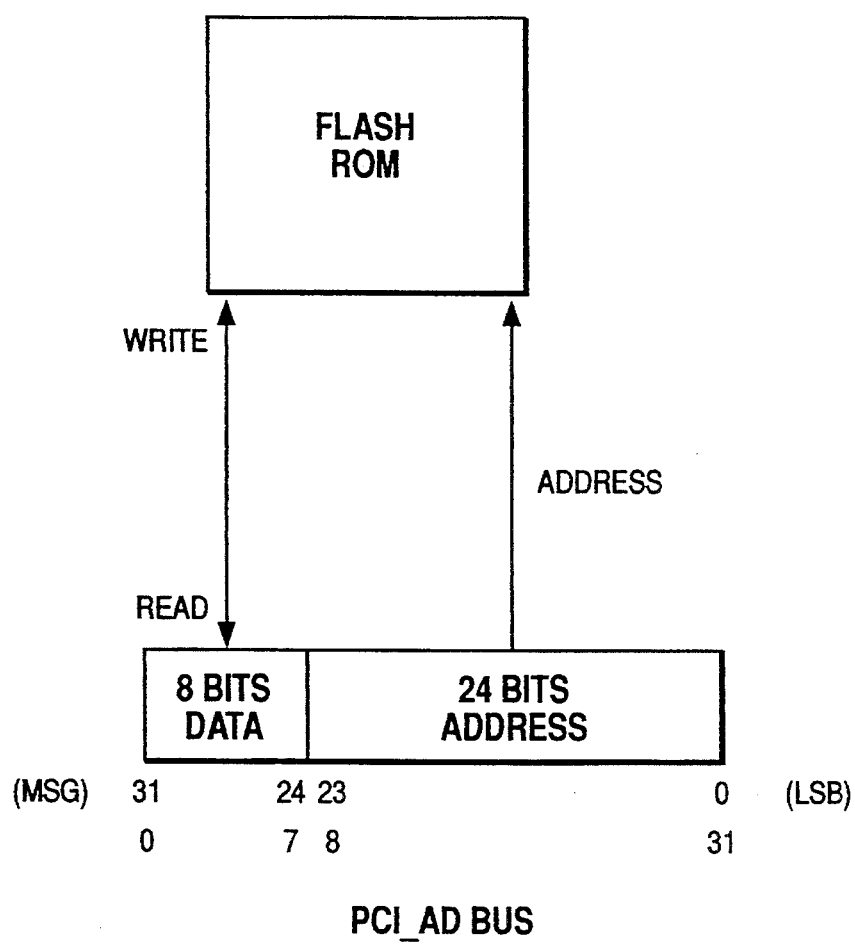
FIG. 3 is a schematic depicting the relationship of address and data b, etween the ROM and PCI bus.

The relationship between the PCI bus lines and the data/address bits of the ROM is also illustrated in FIG. 3. In the read modes processor. has lines 0–23 go directly to PCI bus lines 0–23, while ROM data is returned on lines 25–31 of the 32 line buses. When an address from the processor is decoded to signify a ROM write mode of operation, the ROM address and data are concurrently transferred from processor lines 0–31 to PCI bus lines 0–31. Differentiation of address and data is by ROM connections. Note that the byte lane ordering may be reversed based upon the endian mode that the processor is utilizing. Compensation for endian mode changes is readily accomplished in bridge logic 18 (FIG. 2).

The transmission of information over the PCI bus so that part of the PCI lines are used for address and part are used bi-directionally for data is not a defined PCI bus cycle. Therefore, the PCI control signal lines will not be driven so as to imply activity upon the PCI bus.

To avoid the problem of having another PCI master attempt to gain control of the PCI bus during such ROM read/write sequence, memory/PCI control 4 (FIG. 1) locks out all other PCI devices during the accessing of ROM by the processor by withholding PCI grant signal 15 (FIG. 1).

Figure 4:
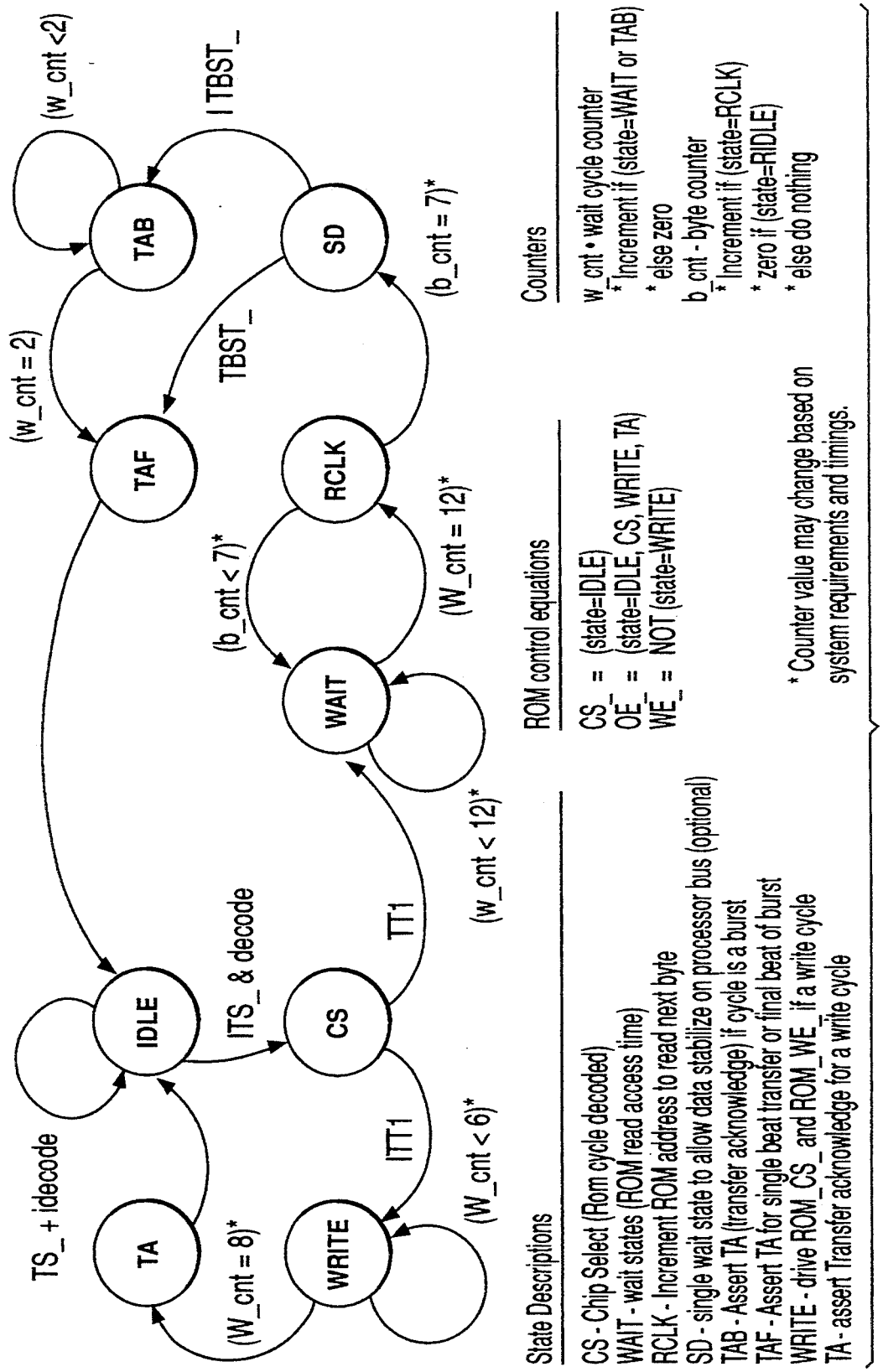
FIG. 4 schematically depicts the states in a state machine which transfers ROM data to the processor.

FIG. 4 illustrates the state machine which defines the accessing and arrangement of the ROM data, as accomplished in bridge logic 18 (FIG. 2). The fundamental objective is to synchronize and recycle operations so that the short word length data as stored in ROM 9 is accessed snd configured to the compatible with the wide bus and processor formats. Since each of the states is illustrated and defined in the figure detailed description of the states and transitions would be superfluous.

Figure 5:
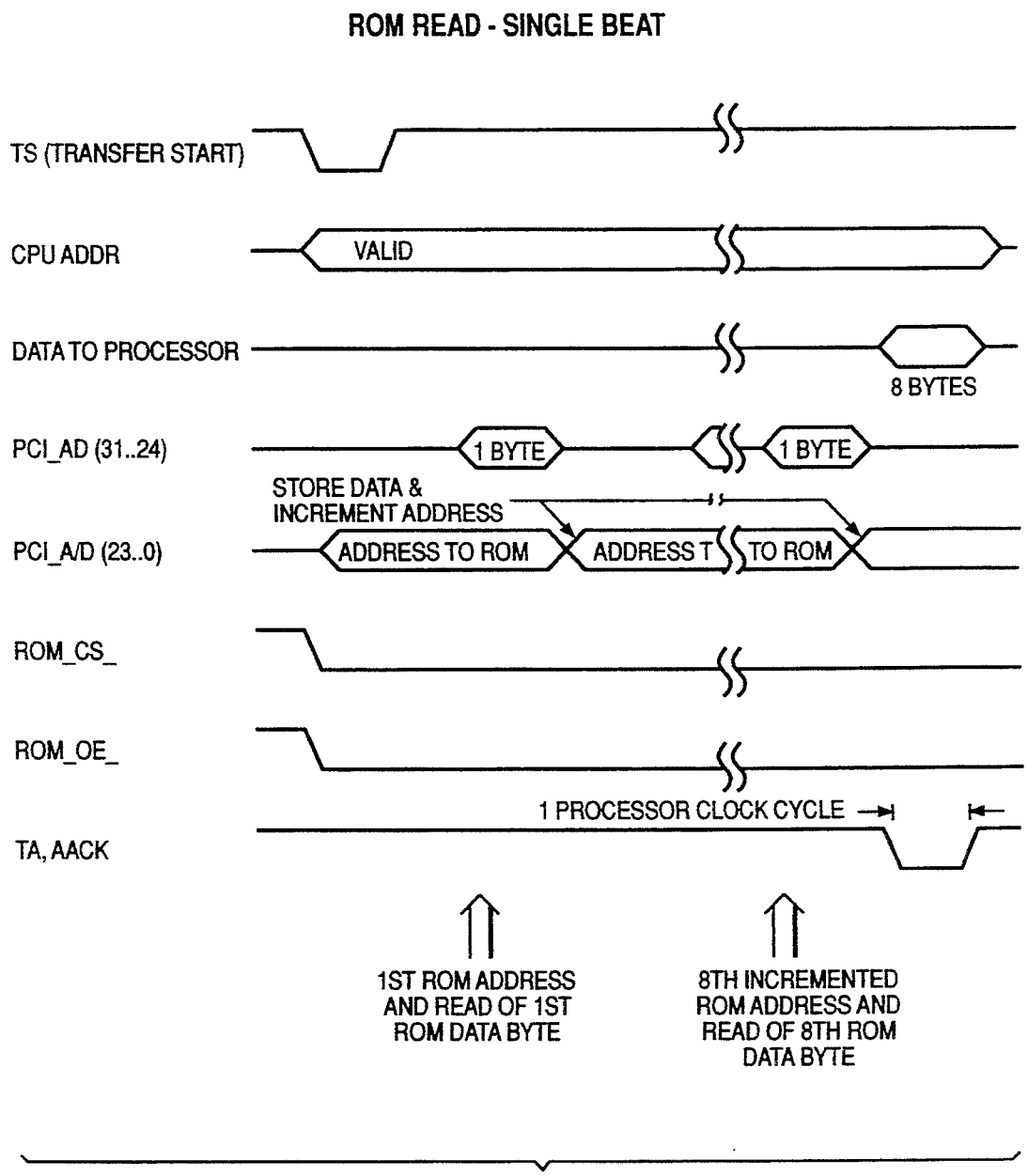
FIGS. 5, 6 and 7 respectively depict timing diagrams representing single beat ROM read, a flash ROM write, and burst mode ROM read cycles.
Figure 6:
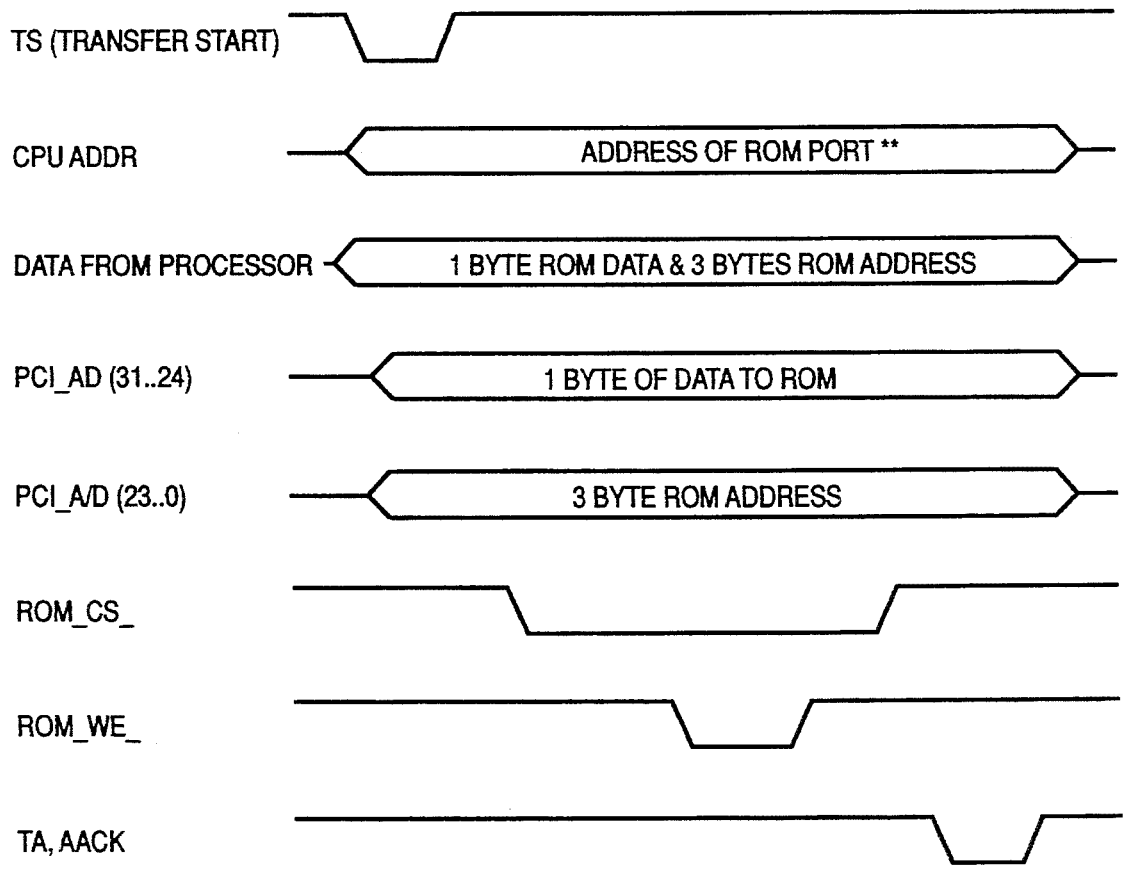
Figure 7:
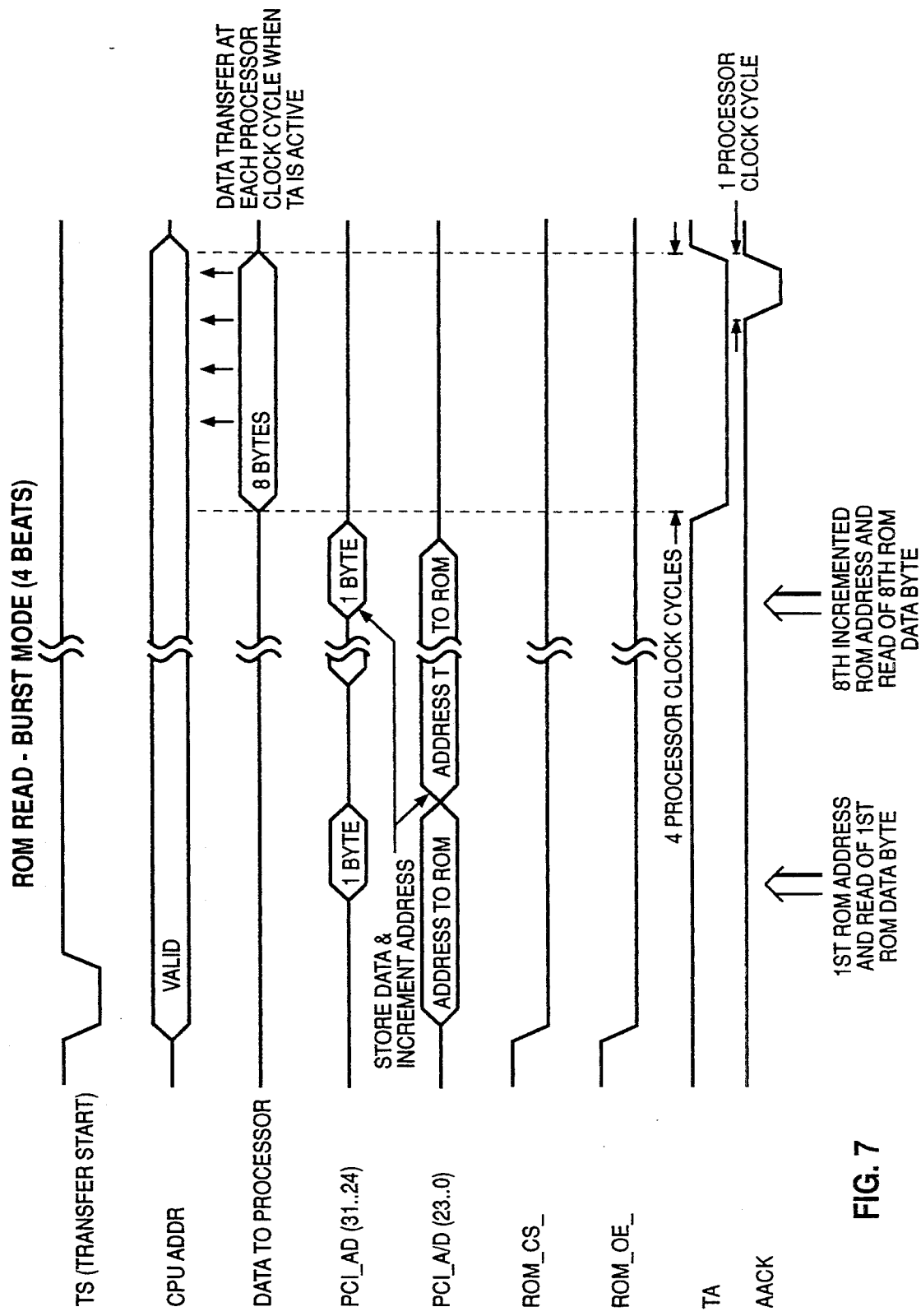

FIGS. 5, 6, and 7 relate the various operations by timing diagrams. The three timing diagrams depict signals at the processor, on the PCI bus, and at the ROM device for various read and write sequences. Note that the single best (non-burst) read sequence in FIG. 5 shows a single succession of 8 incremented ROM addresses and read cycles for each CPU address, including at the termination thereof a transmission of the full 8 bytes concurrently over 64 line wide data bus 16 (FIG. 1) to processor 1. The flash ROM write timing diagram in FIG. 6 shows that a single data word from the processor combines the ROM data and the ROM address. The Transfer Acknowledge (TA) and Address Acknowledge (AACK) signals in FIGS. 5 and 6 are generated to indicate the conclusion of each 8 byte transfer sequence.

FIG. 7 illustrates the timing of signals when the PowerPC 601 processor is performing a burst (4 beat) transfer to fill L1 cache 17 (FIG. 1). As shown, the same 8 bytes of data are repeated in each of the four transfers (beats). Each clock cycle during which signal TA is held active causes 8 bytes to be transferred to the next successive 8 byte position in L1 cache 17. The cycle terminates with the fourth TA active clock cycle, whereupon AACK is activated. The reason for repeating the data four times is to hasten the conclusion of the relatively slow ROM cycles.

Since data is repeated in the burst mode, some useless data is transferred to L1 cache 17 (FIG. 1). To avoid this repetition and useless, data transfer, processor instructions turn off L1 cache 17 periodically, reverting to single instruction fetches. These instructions are few in number and are in ROM 9. If the processor does not start in such burst mode, as does the PowerPC 601, this refinement is unnecessary.

An alternative implementation is to transfer 8 bytes to the processor, continue address incrementation, and perform 4 beats similar to the slngle beat operation depicted in FIG. 5. The only fundamental change necessary would be to activate AACK only on the last beat. However, this sequence would be slow and prevent other operations, such as memory refresh, from occurring.

Though the invention has been described and illustrated by way of a specific embodiment, the systems and methods encompassed by the invention shoulcl be interpreted in keeping witli the breadth of the claims as set forth hereinafter.

I claim:

1. A system for operating a short data word length memory device with a wider bus having address/data multiplex operable devices connected thereto comprising:

means for connecting the data lines of the memory device to a first group of bus lines;

means for connecting the address lines of the memory device to a second group of bus lines;

means for executing a first mode of bus operation, characterizing a read of data from the memory device, by writing a memory address on the second group of bus lines and reading memory data from the first group of bus lines; and means for executing a second mode of bus operation, characterizing a multiplexed operation of the bus with the memory device disabled, by writing an address on the combination of the first and second groups of bus lines and thereafter reading data from or writing data onto the combination of the first and second groups of bus lines.

2. The system recited in claim 1, wherein the memory device is a non-volatile memory.

3. The system recited in claim 2, wherein the nonvolatile memory is a programmable random access memory.

4. The system recited in claim 3, further comprising:
means for executing a third mode of bus operation, characterizing a write of data to the memory device, by writing a memory address on the second group of bus lines and writing memory data onto the first group of bus lines.

5. The system recited in claim 4, wherein the combination of the first and second groups of bus lines together form the wider address/data bus.

6. The system recited in claim 5, wherein the first group, second group, and the wider address/data bus are segmented by bytes.

7. The system recited in claim 6, wherein the non-volatile memory is a flash ROM and the wider address/data bus is defined by the PCI architecture.

8. A method of operating a short data word length memory device with a wider bus having address/data multiplexed devices connected thereto, comprising:

connecting the data lines of the memory device to a first group of bus lines;

connecting the address lines of the memory device to a second group of bus lines;

executing a first mode of bus operation, characterizing a read of data from the memory, by writing a memory address on the second group of bus lines and reading memory data from the first group of bus lines; and executing a second mode of bus operation, characterizing a multiplexed operation of the bus with the memory device disabled, by writing an address on the combination of the first and second groups of bus lines and thereafter reading data from or writing data onto the combination of the first and second groups of bus lines.

9. The method recited in claim 8, wherein the memory device is a non-volatile memory.

10. The method recited in claim 9, wherein the non-volatile memory is programmable random access memory.

11. The method recited in claim 10, further comprising the step of:

executing a third mode of bus opeation, characterizing a write of data to the memory device, by writing a memory address on the second group of bus lines and writing memory data onto the first group of bus lines.

12. The method recited in claim 11, wherein the combination of the first and second groups of bus lines together form the wider address/data bus.

13. The method recited in claim 12, wherein the first group, the second group and the wider address/data bus are segmented in bytes.

14. The metlhod recited in claim 13, wherein the non-volatile memory is a flash ROM and the wider address/data bus is defined by the PCI architecture.

* * * * *